United States Patent
Kim et al.

(10) Patent No.: US 9,427,868 B1
(45) Date of Patent: Aug. 30, 2016

(54) METHOD FOR DEVELOPING AND CONTROLLING A ROBOT TO HAVE MOVEMENTS MATCHING AN ANIMATION CHARACTER

(71) Applicant: DISNEY ENTERPRISES, INC., Burbank, CA (US)

(72) Inventors: Joohyung Kim, Pittsburgh, PA (US); Katsu Yamane, Township of O'Hara, PA (US); Seungmoon Song, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 82 days.

(21) Appl. No.: 14/629,556

(22) Filed: Feb. 24, 2015

(51) Int. Cl.
*G06F 19/00* (2011.01)
*B25J 9/16* (2006.01)
*B62D 57/032* (2006.01)
*G06N 3/00* (2006.01)

(52) U.S. Cl.
CPC ............ *B25J 9/1605* (2013.01); *B62D 57/032* (2013.01); *G06N 3/008* (2013.01); *Y10S 901/01* (2013.01)

(58) Field of Classification Search
CPC .... B25J 9/1605; B62D 57/032; G06N 3/008
See application file for complete search history.

(56) References Cited

U.S. PATENT DOCUMENTS

| | | | | |
|---|---|---|---|---|
| 8,786,680 B2* | 7/2014 | Shiratori | ................. | G06F 3/011 345/156 |
| 2012/0152051 A1* | 6/2012 | Johnson | ............... | B25J 17/0266 74/490.04 |
| 2012/0326356 A1* | 12/2012 | Martin | ................... | G03B 21/62 264/401 |

* cited by examiner

*Primary Examiner* — Ian Jen
(74) *Attorney, Agent, or Firm* — Marsh Fischmann & Breyfogle LLP; Kent A. Lembke

(57) ABSTRACT

A robot having the motion style of a character defined by animation data obtained from an animation movie or computer animation data files. The robot is generated using a robot development method that obtains animation data for a character walking or performing other movements. The character may be humanoid, and the method includes developing a bipedal robot with a lower portion having a kinematic structure matching the kinematic structure of the lower portion of the animation character as defined in the animation data. A control program is generated for the robot such as by using trajectory optimization. The control program may include an open-loop walking trajectory that mimics the character's walking motion provided in the animation data. The open-loop walking trajectory may be generated by modifying the motion of the character from the animation data such that the Zero Moment Point (ZMP) stays in the contact convex hull.

20 Claims, 8 Drawing Sheets

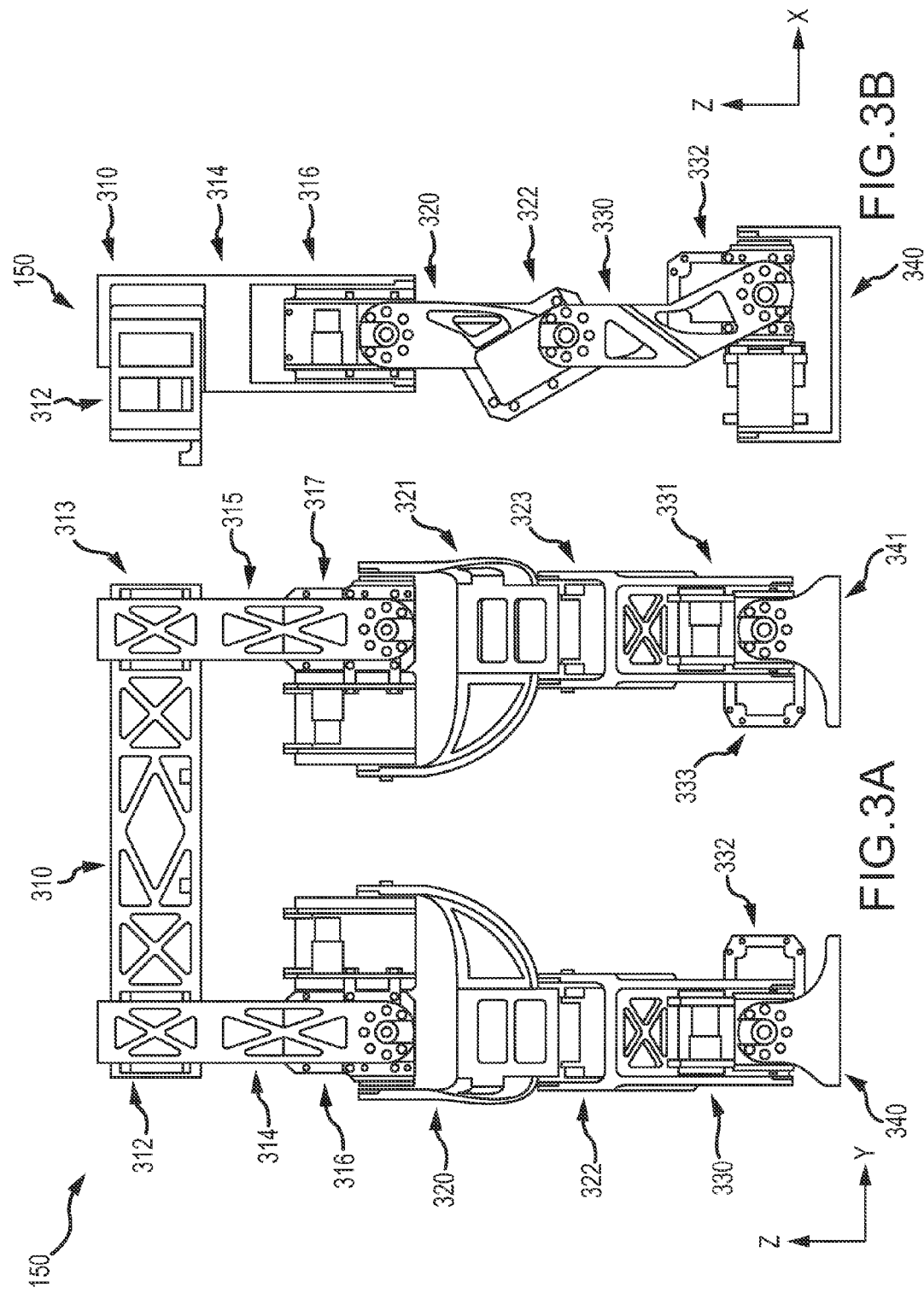

METHOD FOR DEVELOPING AND CONTROLLING A ROBOT TO HAVE MOVEMENTS MATCHING AN ANIMATION CHARACTER

BACKGROUND

1. Field of the Description

The present description relates, in general, to design and control of robots including legged robots (e.g., floating-base, biped humanoid robots or other legged robots such as quadrupeds). More particularly, the present description relates to methods for developing, and then controlling, a robot to move in a manner that mimics or relatively closely matches an animation character's movements, e.g., a bipedal robot developed to walk like an animation or film character.

2. Relevant Background.

There is great demand for engineers and scientists in the robotic industry to create robots that embody animation characters in the real world, such as by taking on similar movements like a way of walking that is unique and readily recognized for the character. This is especially true in the entertainment industry because such character-imitating robots would allow people to physically interact with characters that they have previously only seen in films or on television shows. To give a feeling of life to these robots, it is important to mimic not only the appearance of the character being imitated but also to mimic the motion styles of the character.

Unfortunately, the process of matching the movements and motion styles of a robot to a character, such as a character in an animated film or television show, is not straightforward and prior solutions have not been wholly effective. One problem with designing and controlling a robot to mimic a character is that most animation characters are not designed and animated considering physical feasibility in the real world and their motions are seldom physically correct.

For example, it may be desirable to mimic a character that is humanoid in form, and a designer may choose to mimic the character with a biped humanoid robot, which is a robot with an appearance based on that of the human body. Humanoid robots have been designed for providing interaction with various environments such as tools and machines that were made for humans and often are adapted for safely and effectively interacting with human beings. In general, humanoid robots have a torso with a head, two arms, and two legs each with some form of foot such that the robot can walk on planar surfaces, climb steps, and so on (e.g., these humanoid robots are "bipeds" as are humans). Humanoid robots may be formed with many rigid links that are interconnected by joints that are operated or positioned by applying a force or torque to each joint to move and position a robot. Similarly, other legged robots such as those with three, four, or more legs also may walk utilizing force-controlled movement of their legs.

In order to interact with human environments, humanoid robots require safe and compliant control of the force-controlled joints. In this regard, a controller is provided for each robot that has to be programmed to determine desired motions and output forces (contact forces) and, in response, to output joint torques to effectively control movement and positioning of the humanoid robot. However, it has proven difficult to operate these humanoid robots with such a controller to accurately mimic an animation character's motion style as this style may simply not be physically correct or feasible for the humanoid robot and its links and joints (e.g., its physical components may not be able to perform the character's movements).

Animation characters have evolved to be more realistic in both their outer appearance and in their movements (or motion style). Using computer graphic techniques, three dimensional (3D) characters can be designed and generated with more natural and physically plausible motions with the 3D animation characters. Among many other motions, due to the interest in bipedal characters, generating realistic and natural bipedal walking has been extensively studied by many researchers. One approach to trying to mimic animation characters with bipedal robots has been to directly explore the walking motions with trajectory optimization to find desired motions that obey the laws of physics. Another approach has been to develop walking controllers that allow characters to walk in physics-based simulation. Recently, the computer graphics community has been trying to establish techniques to animate mechanical characters, and a computational framework of designing mechanical characters with desired motions has been proposed by some researchers. To date, though, none of these approaches has provided bipedal robots that consistently mimic an animation character's movements.

As a result, the desire to have lifelike bipedal walking in the real world has persisted in the field of robotics for the past several decades. To address the goal of solving real world problems such as helping elderly citizens in their daily life or resolving natural and man-made disasters, humanoid robots have been developed with high-fidelity control of joint positions and torques. Other bipedal robots that are more compact have been developed for entertainment and for hobby enthusiasts using servo motors. Recently, miniature bipedal robots with servo motors and links provided with 3D printers have begun to gain attention in the robotic industry. To date, though, none of these innovations have provided robots that can readily mimic movement, including walking, of many animation or film characters.

Hence, there remains a need for a method of developing/generating (and then controlling operations of) a robot that can more accurately move like a wide variety of animation characters, including characters that were not created to comply with constraints of the real or physical world. Preferably, the new method would at least be useful for developing a bipedal robot that walks like an animation character and, more preferably, would be useful for designing, building, and controlling a robot chosen to have a physical configuration at least somewhat matching that of the animation character so that the robot can be controlled to have the motion style of the animation character. Also, it may be useful in some implementations that the robots developed with these new methods be built using readily available components such as links that can be 3D printed and joints operated with servo motors and so on.

SUMMARY

The inventors recognized that there was a need for improved methods for designing and controlling robots to bring animation characters to life in the real world. As an exemplary implementation, a bipedal robot is presented that looks like and, more significantly for this description, walks like an animation character. In other words, a robot is designed, built, and then controlled so as to take on the motion style of a character defined by animation data (or data obtained from an animation movie or clip containing the character and/or from computer graphics (CG) files associated with the animation movie/clip).

In brief, the robot development or design method starts with obtaining a set of animation data of a particular character walking (or performing other movements to be mimicked by a robot). In this example, the character is humanoid in form, and the method continues with developing a bipedal robot that has a lower portion including a torso assembly, a left leg assembly, and a right leg assembly that corresponds to the lower portion of the animation character. In particular, the lower portion of the robot is designed to have a kinematic structure matching the kinematic structure of the lower portion of the animation character as defined in or as derived from the animation data.

The lower portion with the matching kinematic structure may then be fabricated, such as with the links being 3D printed or the like and with joint actuators in the form of servo motors. Then, a control program can be generated for the fabricated and assembled robot (or its lower portion) such as by using trajectory optimization or other approaches. The control program may include an open-loop walking trajectory that is configured to mimic the character's walking motion provided in the previously obtained animation data.

The open-loop walking trajectory may be generated by modifying the motion of the character from the animation data such that the Zero Moment Point (ZMP) stays in the contact convex hull. The controller may then use the control program to operate the joints via control of the servo motors (or other joint actuators) such as to test or verify whether the walking provided by the animation data can be performed and whether the robot accurately imitates the character's movements. In tests run by the inventors, the results of this method of developing a robot (its structure and control components) showed marked improvement over prior techniques with movements of an animation character being closely mimicked or copied.

More particularly, a robot is described herein that is adapted to mimic motion of an animation character. The robot includes a plurality of structural segments interconnected at joints and also includes a plurality of actuators each provided proximate to one of the joints for applying a torque to the structural segments to provide movement of the robot. Further, the robot includes a controller providing control signals to the actuators to provide the movement of the robot based on a motion trajectory. To mimic the animation character's movements, the motion trajectory corresponds to a reference motion extracted from animation data for the animation character and then modified based on a kinematic structure provided by the structural elements and actuators. In some implementations, the robot is a bipedal robot, and the reference motion is a walking motion for the animation character.

To implement the robot, the actuators may be configured to provide torque requirements obtained from the reference motion. Further, the reference motion can be modified to provide the motion trajectory while complying with a range of motion defined in the reference motion for the animation character. To provide the motion trajectory for the robot, the reference motion can be mapped to a configuration space of the structural elements of the robot, and the reference motion can be modified by keeping a stance foot flat on the ground to retain stability.

In some embodiments of the robot, the structural segments correspond with elements of a skeleton defined for the animation character in the animation data. In such embodiments, each of the structural elements has a size and a shape corresponding with a size and a shape of one of the elements of the skeleton. Particularly, the shape or the size of at least one of the structural elements can be modified to differ from the shape or the size of the corresponding one of the elements of the skeleton such that the robot has a range of motion corresponding to a range of motion of the animation character as defined in the reference motion. In this regard, the shape and/or size of robot's links/segments may be modified to provide the desired range of motion or motion style so as to better mimic the movement of the animation character.

BRIEF DESCRIPTION OF THE DRAWINGS

FIGS. 3A-3C illustrate front, side, and front perspective views of a robot designed, fabricated, and assembled according to the development methods taught herein to mimic motions of an animation character;

DETAILED DESCRIPTION OF THE PREFERRED EMBODIMENTS

Briefly, the present description is directed toward processes for designing, developing, and fabricating a robot that is particularly well suited to mimic movements of an animation character. The processes taught herein also include generating control programs or commands for causing the fabricated robot to perform movements with a motion style that closely matches or even copies those of the animation character. Further, the description teaches a robot built according to these processes and configured to carry out motions similar to those of an animation character. The processes may be used with nearly any animation data (e.g., data defining kinematic structure of an animation character and movements of such a character) and to provide robots with a widely varying form to take on the form of the animation character in the real or physical world. A bipedal robot is described in the following description as one non-limiting example to mimic a bipedal humanoid character, but the concepts taught herein may readily be extended to other robot configurations.

Figure 1A:
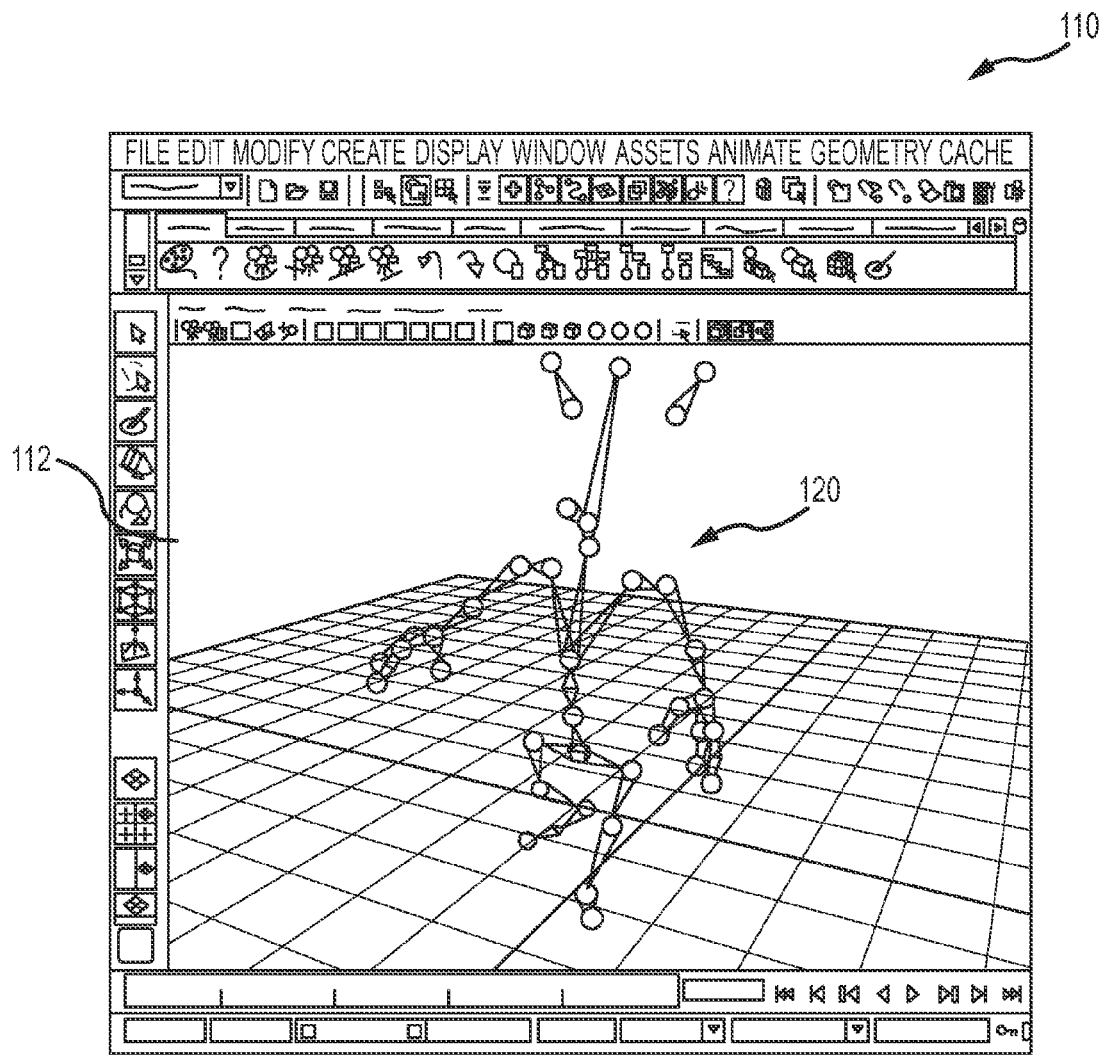
FIGS. 1A and 1B illustrate, respectively, a user interface displaying an animation character (in skeletal or rigging form) and a robot developed for mimicking the motions of the lower power of the animation character.

The following description explains a method for developing a robot that is designed after an animation character, and the description also discusses that the robot can then be controlled or operated using a character-like walking motion generated according to the techniques discussed herein. FIG. 1A illustrates a screen shot 110 of a graphical user interface (GUI) 112 provided by computer animation (or computer graphics) software, which may be MAYA or another software program or suite used by those in the animation industry. In the GUI 112, an animation character 120 is shown that may be used as the basis or input for generating or developing a robot using the robot-development method created by the inventors.

More specifically, the computer animation may involve skeletal animation, which is a technique in computer animation to represent a character 120 in two parts: a surface representation used to draw the character (e.g., the skin, the mesh, or the like) and a hierarchical set of interconnected bones (called the skeleton or rig) used to animate (e.g., pose, keyframe, and the like) the character's skin or mesh. Skeletal animation is a standard way to animate characters for a period of time, and the animation or motion of the character's skeleton (bones/links and its joints) may be completed using inverse kinematics, forward kinematic animation, or other techniques so as to define movements over the period of time. In this manner, the motion style or movement of the particular skeleton of the animation character can be defined by an animator, and the animation data provides not only arrangement of the links and joints (with the skeleton 120) but also its kinematics or movement definitions.

Figure 1B:
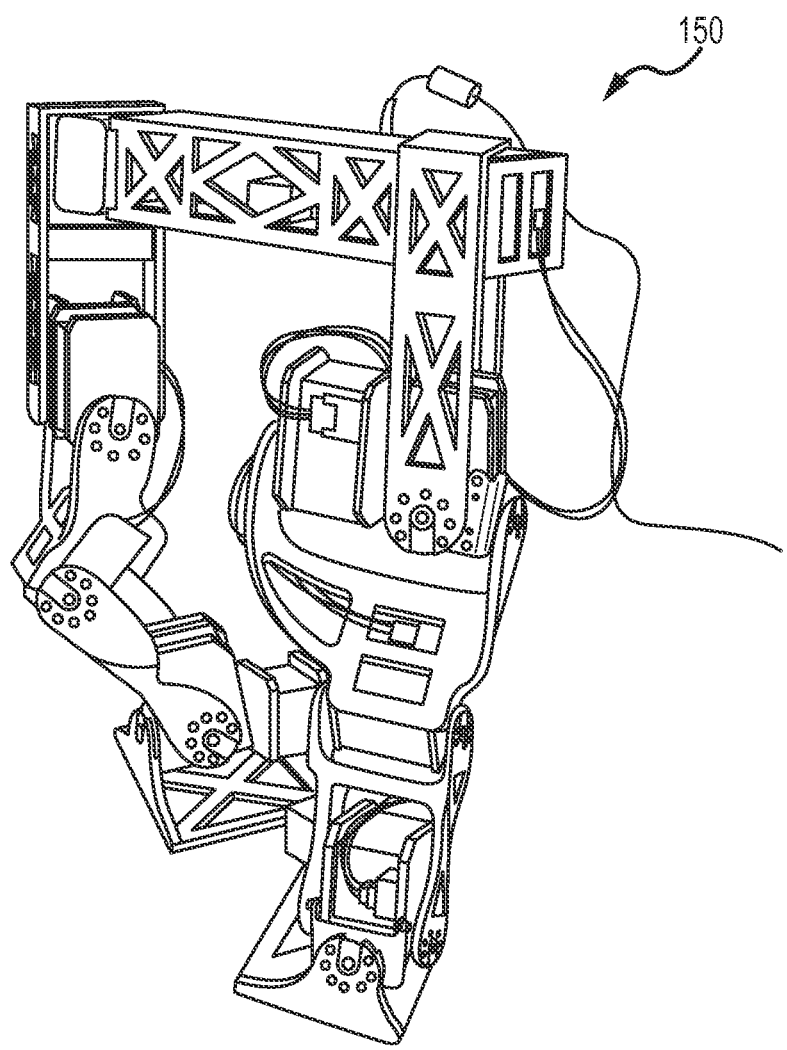

As shown in FIG. 1B, a robot 150 can then developed using the animation data generated by the computer animation software to define the animation character 120 and its motions style and movements. In FIG. 1B, the robot 150 is shown to include the lower portion of a bipedal robot that can be controlled or operated to mimic the motion, e.g., walking, of the animation character 120. The various components of the robot 150 are described in more detail below. The kinematic structure of the robot 150 is designed based on the animation character 120 (or its skeleton design) and is compact enough to be covered by the character skin, mesh, or suit (not shown in FIG. 1A).

In practice, the links of the robot 150 can be 3D printed (or otherwise fabricated) and the joints can be actuated by servo motors or the like. For character-like walking motion, an open-loop walking trajectory can be generated (and was by the inventors in experiments) by using, for example, trajectory optimization. One objective of the walking trajectory generated for the robot 150 is to be similar to (to mimic) the walking of the animation character 120, while preserving stability. This may be achieved in some cases by insuring the Zero Moment Point (ZMP) criterion is satisfied during the walking by the robot 150.

The optimized walking can then be tested on hardware, e.g., an embodiment of the robot 150, so as to verify the robot 150 using the control program or walking trajectory will generate or provide stable walking (which, in many cases, can closely match that of the animation character 120 when it is animated to walk). The following description also explains that through the hardware experiments discrepancies can be identified between the simulation and hardware walking, which can limit the hardware walking at optimized speed (for example). With this in mind, the following description also includes some teaching as to how this discrepancy or problem can be resolved or at least addressed to produce an enhanced robot for mimicking animation characters.

The following provides a framework for developing hardware for a robot and for generating a walking trajectory (control programs/signals) for a robot so as to mimic an animation character and its movements. One main challenge in this regard is that the original animation (e.g., the animation data used to provide the animation character 120) and its motions are not typically designed considering physical constraints. For example, the inventors have proven their method by targeting an animation character (i.e., character 120) that has an ankle-foot section made up of three joints, where each has 3 degrees of freedom (DOF). However, integrating nine actuators into a small foot of a physical robot may not be practical such that the developed robot 150 was based upon the animation character's ankle-foot section but was varied or modified to provide a more practical implementation that can still simulate the movement of the ankle-foot section of the animation character 120. Moreover, the walking motions in animation (or in the animation data for the robot 150 provided by the animation software) are generated with key frames crafted by artists or animators, and these walking motions are often not physically realizable by a robot such as robot 150. In other words, just playing back the walking motion in the animation data on a real robot can result in the robot losing its balance and falling down.

Briefly, the present description is directed toward a human motion tracking controller as well as to a control method used to control a robot and robot with such a controller controlling its balanced movements. The controller (or tracking controller) is adapted to allow free-standing humanoid robots to track given or input motions, such as motions defined by human motion capture data (which may include key frame animation and other sources of human motion data).

One difficulty that was overcome or addressed in designing the tracking controller was that the given/input motion may not be feasible for a particular robot or in a particular environment or point in time, and, without the controller design described herein, the robot may fall down if it simply tries to fully track the motion with a naïve feedback controller. For example, while the captured human motion is feasible for the human subject/model providing the human capture data, the same motion may not be feasible for the robot because of the differences in the kinematics and dynamics of the particular floating-base humanoid robot with its particular design and arrangement of components including force or torque-drive joints. Also, key frame animations are usually created without considering the dynamics of a robot, and, therefore, their use as human motion capture data input to a controller has been problematic for prior controllers as certain motions simply are not possible to perform by particular physical robots.

The following description teaches a tracking controller for use with humanoid robots that can track motion capture data while maintaining the balance of the controlled robot. The controller includes two main components: (1) a component that computes the desired acceleration at each degree of freedom (DOF) using, for example, a standard proportional-derivative (PD) controller; and (2) a component that computes the optimal joint torques and contact forces to realize the desired accelerations, from the first component, considering the full-body dynamics of the robot and the limits in contact forces as well as the constraints on contact link motions. By taking advantage of the fact that the joint torques do not contribute to the six DOFs of the robot's root, the tracking controller has been designed to decouple the optimization into two simpler sub-problems that can be solved in real time (e.g., for real time control over the robot with the controller issuing torque values to each driver of each joint of the robot).

One potential technique for enhancing the stability while controlling a robot is to run multiple tracking controllers at the same time and then to choose one of the controllers to determine the final control input. In addition to the controller that attempts to track the given reference motion (defined by the motion capture data input to the tracking controller), the tracking controller (or controller assembly) may include another instance of the controller run with a fixed static equilibrium pose as the reference. Then, the tracking controller assembly can choose the actual input to the robot depending on how close the robot is to losing its balance. In other words, the controller with the fixed reference can be used (or act to take over control) when the robot is determined to be about to lose balance so as to safely stop the robot at a static equilibrium pose (e.g., controlled to not perform or track motions that would cause it to fall or lose balance).

Figure 2:
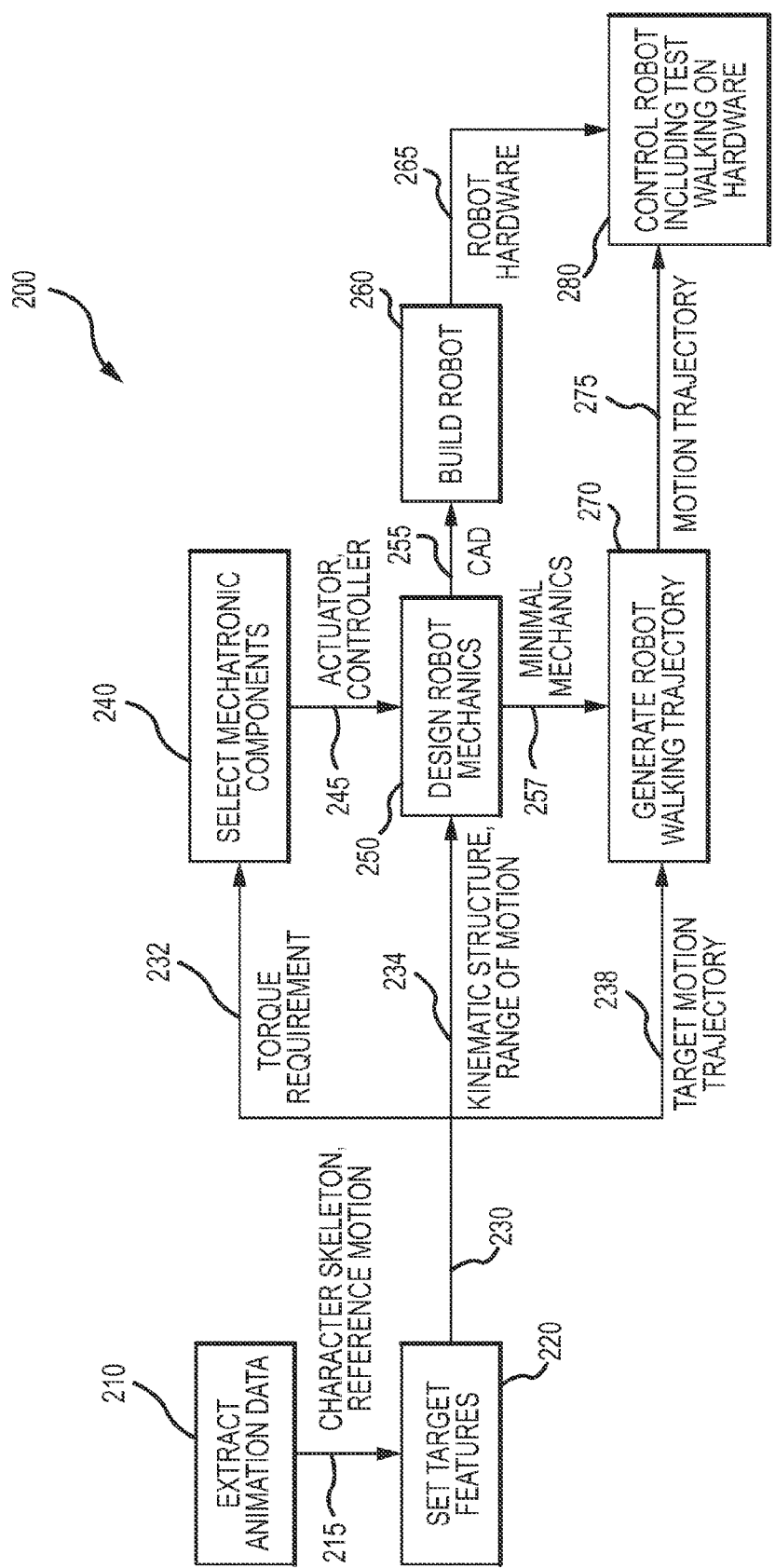
FIG. 2 illustrates a method (or steps of framework) for designing/developing a robot (e.g., its mechanics) and a movement control program (set of control signals such as to provide walking trajectory if the mimicked motion is a walking motion) using animation data as input.

FIG. 2 illustrates a method 200 for developing a physical robot from animation data including generating a control program to mimic the motion of an animation character defined by the animation data. The method 200 begins at 210 with receiving a set of animation data as input for developing a physical robot, and this step may be performed by a processor on a computer/computing device running the computer animation software, too, or by a separate processor on the same or separate computer/computing device. Each of these processors would execute the code or software program instructions to perform the functions/steps of the method 200. Further, the processor would have access to memory for storing the animation data, extracted parameters and definitions, and other data generated during performance of the method 200.

In step 210, the method 200 may involve extracting and analyzing the animation data to obtain information useful for creating the physical robot (e.g., the animation character's skeleton) and for generating a mimicking motion with the created physical robot (e.g., reference motion as defined by animation data). This extracted data 215 is passed on to the next step or function 220 that involves setting target features for the physical robot. In one implementation, the animation data may be provided from a computer animation program such as MAYA.

Based on output 215 of the analysis in step 210, target features can be set in step 220 including the kinematic structure of the robot (e.g., the robot's links (size, shape, and so on), joints between links, actuators for joints, and the like), range of motion (ROM) for the components of the kinematic structure, and torque requirements of each joint of the kinematic structure. The processing and optimizing of step 220 (and other steps such as steps 240, 250, 270) may involve use of MATLAB Simulink/SimMechanics (R2013a) or other software products presently available or as may be available in the future to aid robotics design.

As shown, step 220 provides a set of output (target features) 230 for use in later design/development steps. Particularly, torque requirements 232 for each joint of the kinematic structure produced based on the character skeleton 215 are provided to a step/process 240 that functions to select mechatronic components such as actuators that can realize the target features (e.g., the torque requirements 232 for the joints). Further, the output 230 may include the kinematic structure of the robot as well as the ROM for the structure or its components as shown being provided at 234 to process step/function 250.

Step 250 involves designing the robot mechanics including segments/links and joints between links based both on the kinematic structure (e.g., links to match or correspond with bones in the character's skeleton) and the ROM for this structure (e.g., joints can be configured to provide stops or otherwise achieve the various ROMs of the animation character as may be defined by the character skeleton and/or its animation in the reference motion 215). As further input to step 250, the output/results 245 of step 240 may be provided including actuators, controllers, and other selected mechatronic components. The output 255 of step 250 may be a digital model such as a computer aided design (CAD) model of the designed robot mechanics, and this output 255 can be used as input to a step 260 of building/fabricating the robot (e.g., printing 3D parts to provide the links/segments, obtaining the actuators, the controller(s), and mounting/assembly hardware, and so on and then assembling these components). The output 265 of step 260 is a fabricated robot such as robot 150 of FIG. 1B.

Additionally, the output 230 of the target feature setting/selecting step 220 may include a target motion trajectory 238 that may be provided as input to a step 270 that involves generating a robot motion trajectory (e.g., a walking trajectory in this example). To generate this trajectory (e.g., an open-loop walking trajectory) for the robot (fabricated/assemble in step 260), the animation walking motion 215 obtained from the animation data in step 210 is modified in step 220 to provide a target motion trajectory 238 that is suitable for the robot 265. Specifically, step 220 may involve mapping the motion to the robot's configuration space. Then, the motion can be modified to keep the stance foot flat on the ground so that stability is guaranteed, such as through use of the traditional ZMP criterion, which is widely used in the robotics industry for controlling robots to provide bipedal walking.

Then, to generate the robot walking trajectory 270, minimal mechanics 257 are obtained from step/process 250. Further, it is assumed in step 270 that the walking motion should be designed/selected so as to be stable while preserving the walking style (motion style) of the animation character as defined or provided in reference motion 215 from the animation data. In some embodiments, step 270 involves use of trajectory optimization. Particularly, this optimization is performed with the objective function of minimizing the deviation from the target walking motions and keeping the center of pressure (CoP) or the ZMP in the support polygon.

The product of step 270 is a motion trajectory that can be used by a robot controller provided on/in the robot hardware (or offboard in some cases) to control the actuators to perform a set of movements or a motion that mimics that of the reference motion 215 obtained from the input animation data. In step 280 the robot controller acts to control the robot based on this optimized motion trajectory 275 to perform the walking (or other) motion, which can initially be tested by tracking the joint trajectories. Step 280 may involve further adjustment of the motion trajectory to obtain movements that even more closely match that of the reference motion 215 from the animation data.

The method 200 may be applied to a whole robot or to select portions of a robot. In the following discussion, more details are provided for performing the steps/processes of the method 200 with regard to providing and operating robot hardware of a lower body or portion of an animation character that can be modeled as a bipedal humanoid robot. First, data is extracted from animation data. In one specific implementation, a skeleton structure of an animation character was extracted from an input animation data file from a computer graphics program/software product (e.g., MAYA or the like). In the particular embodiment as shown with animation character 120 of FIG. 1A, each leg had 15 DOF, there was 3 DOF at the hip, 3 DOF at each knee, 3 DOF at each ankle, and 6 DOF in each foot.

Table I below provides the extracted values for the foot, shank, and thigh heights and the pelvis width. Comparing to typical miniature bipedal robots, the pelvis is wide (at 18.8 centimeters) relative to the leg length (20 centimeters=8.1+ 8.9+3.0 centimeters), which makes the later balance during walking with a physical robot more challenging.

TABLE I

Target and Final Kinematic Configuration (the target segment dimensions are from the animation character and the ROM requirements are from a simulation study)

| dim. | full body (height) | pelvis (width) | thigh (height) | shank (height) | foot (height) | foot (length) |
|---|---|---|---|---|---|---|
| anim. | 73.0 | 18.8 | 8.1 | 8.9 | 3.0 | 10.0 |
| robot | — | 20.0 | 8.9 | 9.8 | 3.7 | 10.6 |
|  |  |  |  |  |  | (unit: cm) |

| ROM | $hip_{yaw}$ (intern~ extern) | $hip_{roll}$ (adduct~ abduct) | $hip_{pitch}$ (extend~ flex) | $knee_{pitch}$ (extend~ flex) | $ankle_{pitch}$ (extend~ flex) | $ankle_{roll}$ (invert~ evert) |
|---|---|---|---|---|---|---|
| req. | −15~45 | −35~15 | −15~60 | 20~115 | 0~70 | 0~20 |
| robot | −40~90 | −55~90 | −105~135 | 0~115 | −30~120 | −20~90 |
|  |  |  |  |  |  | (unit: degree) |

Once the character skeleton and reference motion are extracted from the animation data, the method can proceed to setting target features for the robot and its motion trajectory. The skeleton data of the animation character does not include inertia properties, and it is typically impractical to build a physical robot (or robot hardware) exactly as defined by the animation data for an animation character. For example, the ankle-foot portion of a skeleton of an animation character (e.g., character 120 of FIG. 1A) may have 9 DOF, which is difficult to implement in the volume of a typical robot's foot (or most physical characters' feet). Considering these factors and design issues, the method can be implemented using a number of criteria for designing the robot hardware such as: (1) set the number of DOF realizable; (2) keep the dimensions of the robot and its components as close as practical to those of the animation character; (3) insure the range of motion (ROM) is suited for achieving the reference motion(s) (e.g., walking); and (4) insure the torque capability for the reference motion (e.g., walking).

In the exemplary implementation, the goal of the development method/process was to generate a robot that could mimic the walking motion found by the animation character in the original animation (or animation data). With this in mind, the dynamics of the target walking motion were investigated in simulation, with details of this simulation/experiments explained in more detail below. Through this simulation study, though, it was verified that a leg configuration of a typical miniature humanoid robot, which includes a thigh, a shank, and a foot connected by a 3 DOF hip joint, a 1 DOF knee joint, and a 2 DOF ankle joint, can accurately mimic the walking motion (as defined in the test run with a reference motion for the animation character 120 of walking in with a particular motion style). Furthermore, the simulation result provided an estimate of the range of motion (see Table I) and torque requirements of each joint for the walking motion.

Once the target features are chosen/set based on the extracted information from the animation data, the method can proceed with selecting the mechatronic components for the robot. For example, this may involve selecting a set of joint actuators by searching from a set/database of available joint actuators that can meet the estimated torque requirements. The search, in some cases, can be limited such as to servo motors or another desired type of actuator with servo motors being useful to facilitate control and testing involving tracking joint trajectories. In one particular, but not limiting example, servos distributed/produced by Dynamixel were used as these are widely available and commonly used for humanoid robots with joint position controllers (which can also be chosen to build the robot). More specifically, the MX-106T from Dynamixel was used as the actuator for the hip and knee joints while the MX-64T from Dynamixel was used as the actuator for the robot's ankle joints. The maximum torques that the MX-106T and MX-64T can exert ($\tau_{106,max}$ Nm and $\tau_{64,max}$ Nm) given the angular velocities ($\Omega$ rad/s) are:

$$\tau_{106,max}(\Omega) \approx 8.81 - 1.80 \times |\Omega|$$

$$\tau_{64,max}(\Omega) \approx 4.43 - 0.66 \times |\Omega| \qquad \text{Eq. (1)}$$

which can be set as constraints in the walking motion optimization (as discussed below).

Further, in the specific test or prototype implementation used by the inventors, an OpenCM9.04 microcontroller board was used with an OpenCM458EXP expansion board. With this controller for the robot, joint position commands were sent to the servos every 10 milliseconds in TTL. In the test run, the power was provided off-board, but it is expected that the controller and power of many robots developed and built with the techniques described herein will be provided on-board.

Once the target features are selected or generated from the animation data, the robot mechanics can be designed or generated. Continuing with the example of the animation character 120 of FIG. 1A and the desire to mimic it's walking motion, the kinematic structure of robot 150 (from FIG. 1B but shown in more detail in FIGS. 3A-3C) was designed in one test of the method taught herein. The kinematic structure of robot 150 was designed so as to have components as found in the skeleton of the animation character 120 and also to keep close to the dimensions of the animation character. Further, the elements of the kinematic structure were also designed to insure the ROM for walking with a motion style defined by reference motion for the animation character 120.

Figure 3C:
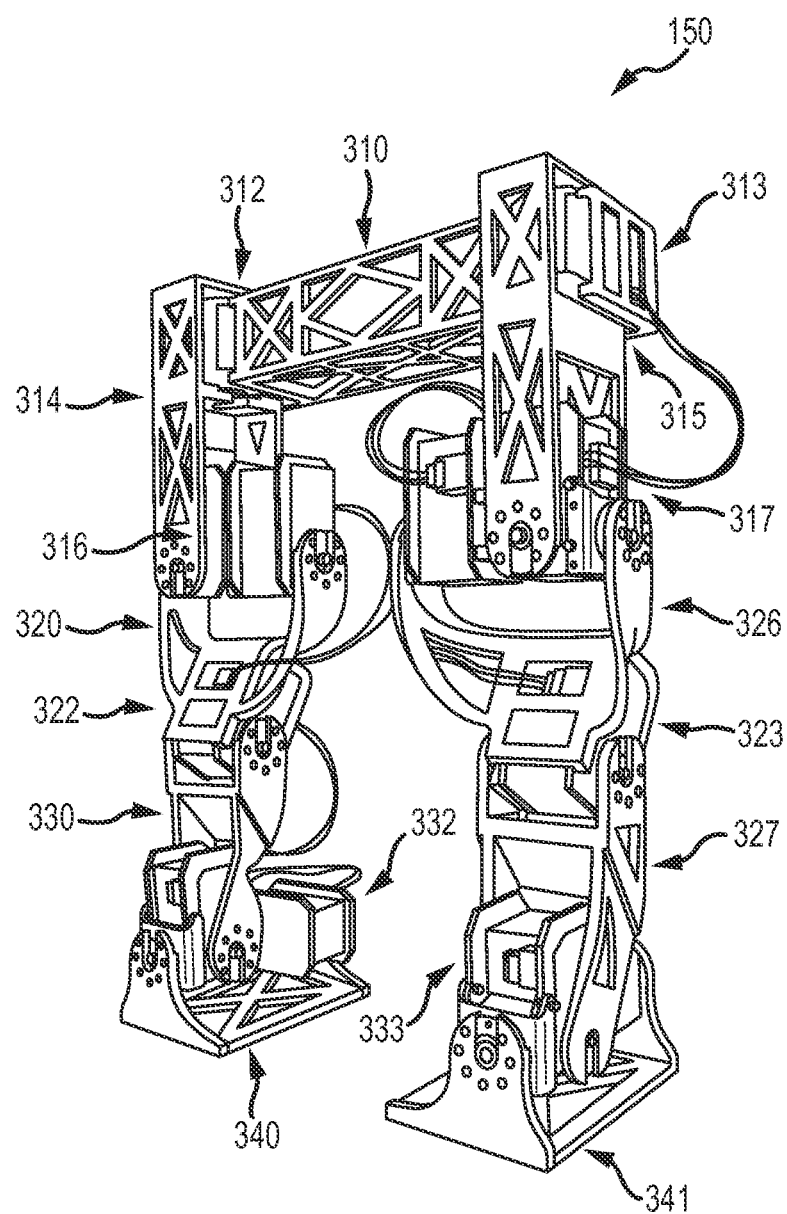

FIGS. 3A-3C show the various elements (mechatronic components) of the kinematic structure of the robot 150. In this example, the robot includes the following segments/links: pelvis 310; right and left pelvis links 314, 315; right and left thigh links 320, 321; right and left shank/shin links 330, 331; and right and left feet links 340, 341. Further, the robot 150 includes the following set of actuators (e.g., servo motors): hip actuators 312, 313, 316, and 317; knee actuators 322, 323; and ankle actuators 332, 333. The order of the actuators from medial to distal is hip yaw, hip roll, hip pitch, knee pitch, ankle pitch, and knee roll. The thigh, shank, and foot segments of the robot 150 are slightly longer than the animation character to secure the ROM, and the pelvis width is wider to keep the proportion similar to Table I. Hence, the method involves first selecting the segments/links to match the skeleton and its size, but then modifying, if needed, the size and/or configuration to assure the ROM is provided in the physical robot.

As in the animation character 120, the three rotational axes of the hip joints and the two rotational axes of the ankles are co-aligned at each joint. In addition, the method of design involved attempting to align the hip, knee, and ankle pitch joint in the sagittal plane at the default configuration (e.g., stand straight configuration). However, due to the size of the ankle servos (e.g., other mechatronic components), the ankle pitch joint was placed forward in the final design of the robot 150 as shown in FIG. 3B. Further, the design step(s) of the method involved tilting the knee servos at default configuration to realize the target ROM (i.e., the target ROM is used to modify or rearrange the skeleton arrangement from the animation character (e.g., the ROM may override or be given greater emphasis to better mimic the reference motion from the animation character)).

Once the design of the robot is completed, the robot's parts can be fabricated or otherwise obtained and fabricated to provide the robot. In the ongoing example of robot 150, the segments/links were all 3D printed and then assembled using aluminum frames and the actuators (as shown in FIGS. 3A-3C). In one prototype robot 150, the 3D printer was the Object260 Connex available from Stratasys, and this 3D printer was used to print the segments with RGD525. The frames were aluminum robotic frames available from Robotis. The mechanics and the electronics are summarized below in Table II.

TABLE II

Hardware Specifications for Fabricating Robot

| height | 35 cm | DOF | 12 | power | off-board |
|---|---|---|---|---|---|
| weight | 2.55 kg | actuator | MX-64T (×8) | con- | OpenCM9.04, |
| leg len | 22 cm | | MX-106T (×4) | troller | OpenCM458EXP |
| pel wid | 20 cm | segment | RGD525 | comm prot | TTL |

(leg len: leg length, pel wid: pelvis width, ctrl prot: control protocol)

With these aspects of the robot development and control method understood, it may be useful to further describe the use of this method to provide a stable walking motion that mimics the walking motion of an animation character using animation data (e.g., to mimic the animation character 120 shown in FIG. 1A). First, data is extracted from the animation data for character 120. As with most animations, the original walking motions given in an animation file from conventional computer animation software are handcrafted by artists or animators by interacting/using the animation software (e.g., Maya or the like).

In the working example of character 120, the animation data provided reference motion in the form of two similar, but not identical, asymmetric gaits. From these gaits, the method involved generating (or designing) four different single stance motions. For the animation walking motions, one stride took 1.1 second to 1.2 second. Further, a double support phase compose was about 15 percent of a full step, and a stance phase started with a heel-strike pose and ends with a toe-off pose. Further, from the animation data, it was determined that the foot is rotated about 30 degrees during stance (see below in FIG. 5A for more detail of the reference motion of the animation character).

In the exemplary implementation/test of the robot development method, the inventors aimed at generating one walking motion for the robot to mimic the animation character 120 and its walking motion (i.e., the reference motion input to the method). This one walking motion was designed to look similar to the animation, but not necessarily replicate the reference motion. Since the robot 150 has different kinematic configuration than the animation character, the position trajectories of the segments/links were extracted (rather than the joint trajectories) in the Euclidean space $\overline{P}_{anim}$. In detail, the positions were extracted of the center of the pelvis, hips, knees, ankles, and tip of toes, and the motions were provided with a time frequency of 24 frames per second.

In the next step of setting target features, the target joint trajectories were generated for the single stance motion for the robot, $\overline{\phi}_{tgtSS}$, based on the original motion in the Euclidean space, $\overline{P}_{anim}$. The target motions for the double support phase were not generated since it is relatively short and there is not much freedom in the motion since both feet remain at their positions. For the single stance motion, the animation motion was modified to be suitable for the robot by: (1) keeping the stance foot flat on the ground and (2) mapping the motion in the Euclidean space into the robot's configuration space. In addition, based on the original motions and the range of motion (ROM) of the robot 150, the stance foot was set to point outward by 30 degrees, and the step length and step width were set to be 15 centimeters and 13 centimeters, respectively.

The original single stance motion, $\overline{P}_{anim,SS}$, is first modified in the Euclidean space to keep the stance foot on its position ($\overline{P}_{tgtSS}$). The stance leg in all time frames is linearly translated to locate the stance foot at its position. The swing leg is translated only in the horizontal plane and properly scaled along the vertical (or gravitational) axis to preserve the original vertical motion of the swing foot while maintaining the relative positions between the stance hip and the swing hip. The swing leg trajectory is further modified so that the swing foot starts and ends at positions that connect with the previous and next stance foot configurations, respectively.

Target motion trajectories for the robot, $\overline{P}_{tgtSS}$, which are target trajectories of the segments in the Euclidean space, were converted into the robot's configuration space. This process differs from typical inverse kinematics (IK) in that there are target positions for each segment (as opposed to having a target position only for one end effector), and these targets are not always reachable by the robot. This was solved in the test implementation by running physics simulations for each pose with virtual spring dampers connecting the segments to their target positions. By reading joint angles from the simulation results of all poses, the target joint trajectories, $\overline{\phi}_{tgtSS}$, can be obtained (as shown in FIG. 5B).

By modifying the four different animation walking motions with the same process, the four target joint trajectories were acquired for the single stance phase. All four walking motions are shown with dotted lines in the graph 400 of FIG. 4. Specifically, graph 400 shows the optimized walking trajectory. The optimized trajectories for a full stride (shown with the solid lines) are compared to the target joint trajectories modified from the animation data (shown with dotted lines).

FIGS. 5A-5D show, with sets of graphic screen shots and with images of the operating robot, an animation motion (reference motion), a target motion for a robot, an optimized motion for the robot, and the actually achieved robot motion. One goal of the robot development method is to make the robot walk in a manner that is similar (or mimics) the walking motion in an animation of the animation character being modeled. The animation character's walking motion is shown in the series 510 of screen shots from an animation (from animation data). The method involves first modifying the animation walking as shown with screen shots 520 by mapping the reference motion of the animation character to a robot configuration space and by keeping the stance foot flat on the ground.

Figure 5:
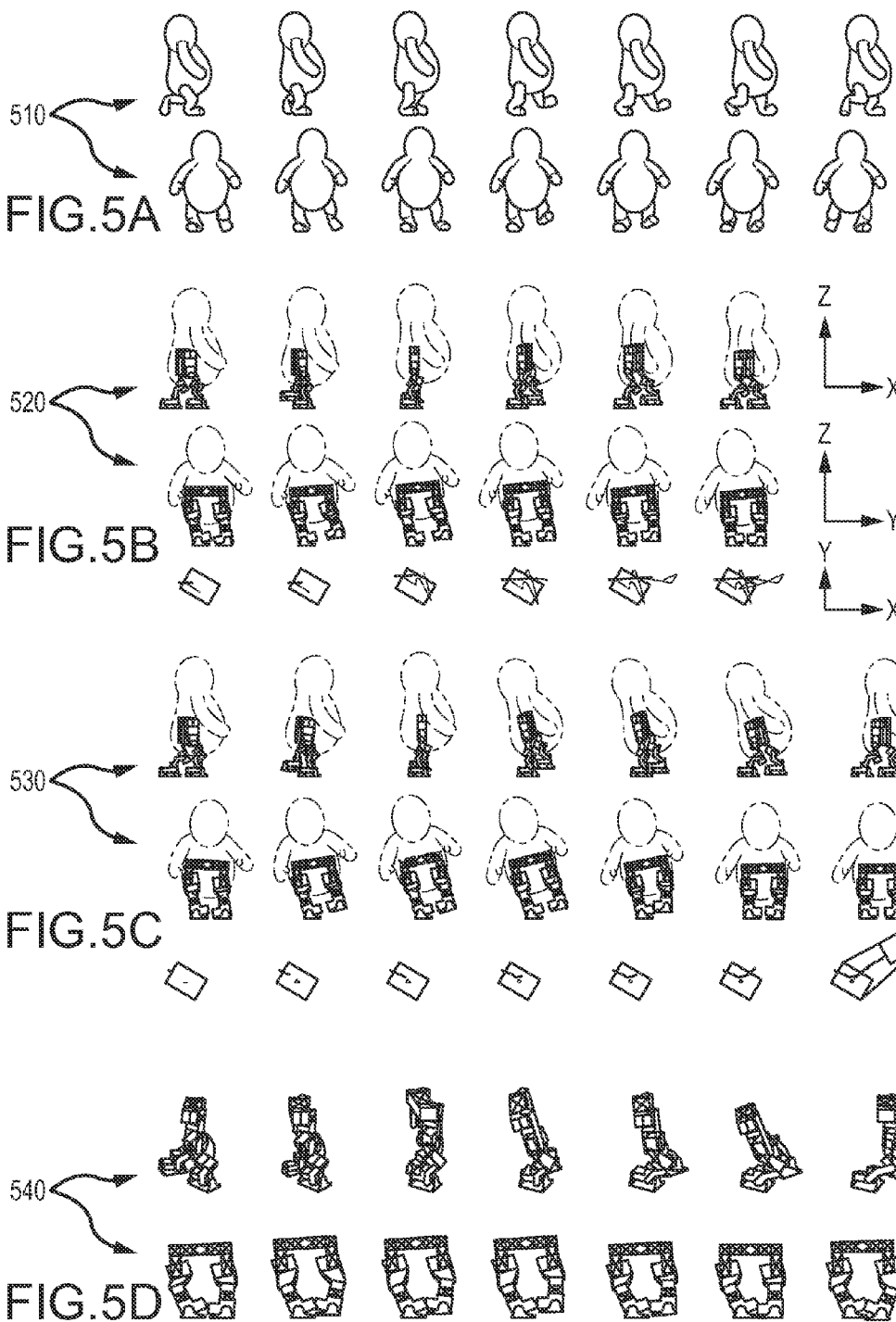
FIGS. 5A-5D show, with sets of graphic screen shots and with images of the operating robot, an animation motion (reference motion), a target motion for a robot, an optimized motion for the robot, and the actually achieved robot motion.

Since the modified motion is physically incorrect (e.g., the CoP gets out of the foot in the sequence shown in FIG. 5B), the walking is modified to be physically realizable by keeping the CoP inside the support polygon as shown in the series 530 of shots shown in FIG. 5C. Finally, as shown in the series 540 of images in FIG. 5D, the optimized walking motion from FIG. 5C is used to control (is played back) the robot 150 (or on the designed, fabricated, and assembled hardware). Due to the deformation of the hardware, which results in slipping at the optimized motion speed, the motion was played back a slower time in this test (e.g., two times slower than the optimized speed).

FIG. 5B shows one of the target motions, $\bar{\phi}_{tgtSS}$, tracked in physics simulation by assuming the stance foot is welded to the ground. The simulation shows that the CoP (black line in the lower series of images) gets out of the support polygon (gray area), which means the robot will fall down if the motion is tracked with the robot. The remaining step/process described here is to generate a walking motion, which is similar to the four $\phi_{tgtSS}$ sets and is physically realizable without causing the robot to fall down, i.e., the CoP remains in the foot as known as the ZMP criterion. This problem can be solved using trajectory optimization or other techniques may be used to practice the present inventive method(s).

Trajectory optimization is a well-established method for designing optimal trajectories for given criteria and constraints. The single stance can be parameterized as $\hat{\phi}_{SS}$ with 145 (=12×12+1) parameters, where 12 parameters represent equally time-spaced nodes of each joint trajectory (×12), and an additional parameter defines the time duration of the single stance motion (+1). To evaluate a set of parameters $\hat{\phi}_{SS}$, joint trajectories are reconstructed from the parameters, the forward kinematics (FK) is solved to investigate the motion, and the inverse dynamics (ID) is solved to examine the dynamics. More specifically, the joint trajectories can be reconstructed with spline interpolation, and a physics simulation can be run with MATLAB Simulink/SimMechanics (R20113a) (or other software tools) in joint angle tracking mode with the stance foot welded on the ground to solve FK and ID.

From the results of FK and ID, the single surface motion can be evaluated based on how similar the motion is to the target motion ($\|\phi_{SS}, \phi_{tgtSS}\|$) and how close the CoP remains at the center of the stance foot ($\|COP_{SS}\|$). The difference of the motions and the CoP deviation are defined as the root mean squares of the differences of the joint angles as $\|\phi_{SS}, \bar{\phi}_{tgtSS}\| = \sqrt{\overline{\phi_{SS,traj}}^2 - \overline{\phi_{tgtSS,traj}}^2} + \Sigma_{joint}\Sigma_k \sqrt{\phi_{SS,t}^2 - \bar{\phi}_{tgtSS,t}^2}$ and $\|COP_{SS}\| = \Sigma_t \sqrt{x_{COP,SS}^2 + y_{COP,SS}^2}$ respectively. Note, the former one is calculated at every target frame, k, and the latter one is calculated at every simulation time step, t.

Since a parametrized single stance motion, $\hat{\phi}_{SS}$, can be evaluated, the problem of generating the optimal motion can be formulated as a nonlinear constrained optimization problem as:

$$\min_{\hat{\phi}_{SS}} c_{SS}\|\hat{\phi}_{SS}, \bar{\phi}_{tgtSS}\| + c_{COP}\|COP_{SS}\| \qquad \text{Eq. (2)}$$

subject to $P_{SS,k=1,K}^{foot} = P_{tgtSS,k=1,K}^{foot}$ —C1

$\|COP_{SS}, COP_{limit}\| < 0$ —C2

$z_{SS,k=2,...K-1}^{Sw\text{-}foot} > 0$ —C3

$\tau < \tau_{max}(\Omega)$ —C4

$|GRF_z| > 0$ —C5

$|GRF_{x,y}/GRF_z| < \mu$ —C6

One goal may be to minimize the deviation from the target motion, $\hat{\phi}_{SS}$, while increasing the stability of the motion, i.e., keeping the CoP near the center of the stance foot. The weighting coefficients, $c_{SS}$ and $c_{COP}$, are heuristically found to balance the goals. Constraint 1, C1, guarantees that the swing foot starts and ends at target positions, which is necessary for symmetric walking. All other constraints (C2 to C6) insure physically realizable walking motions: C2 insures that the model does not fall down; C3 keeps the swing foot ($z_{SS,k=2,...k-1}^{Sw\text{-}foot}$) to be higher than the ground; C4 checks if the servos are capable of generating such torques (Eq. (1)); C5 assures the stance foot does not take off the ground; and C6 is intended to avoid slipping at the stance foot ($GRF_{x,y,z}$ are the ground reaction forces along each axis, and the inventors used a friction coefficient $\mu=0.6$ in the tested prototype). In theory, C2 is enough to prevent the robot from falling down without the cost term of $COP_{SS}$. However, by keeping the CoP near the center of the foot, the modeling errors and small disturbance (which always exist in real environments) can be compensated for in the operation of the robot.

In the test, the covariance matrix adaptation evolution strategy (CMA-ES) was used to optimize the trajectory parameters, $\hat{\phi}_{SS}$. To force the constraints, a large constant, e.g., $c_L = 10^6$, was added to the cost when the constraints were violated. One of the target trajectories was used as the initial parameter, and the CMA-ES was run with a population size of 64 for 6000 generations. Without optimizing the implementation for running speed, it takes about two days to run on a conventional desktop computer.

With regard to generating a robot walking trajectory (e.g., double stance phase), once the single stance motion, $\hat{\phi}_{optSS}$, is optimized to generate the full walking motion, the double stance phase motion, $\hat{\phi}_{DS}$, can be generated which connects the last pose of the single stance phase and the first pose of the next single stance phase. The segment positions in the Euclidean space are interpolated between the target start and end poses, and then the IK is solved to get the joint trajectories. In the test case, the interpolated double stance motion is stable, as the CoP remains in the support polygon progressing from the previous stance foot toward the next stance foot. If the motion were, instead, not stable, a stable one can be generated by optimizing the trajectory similar as to that of the single stance phase. For optimizing the double support motion, the cost will be $\|COP_{SS}\|$. Since a target double stance motion is not available, the first constraint, C1, is applied for all time steps, and $COP_{limit}$ will be the support polygon which covers both feet of the robot.

Figure 4:
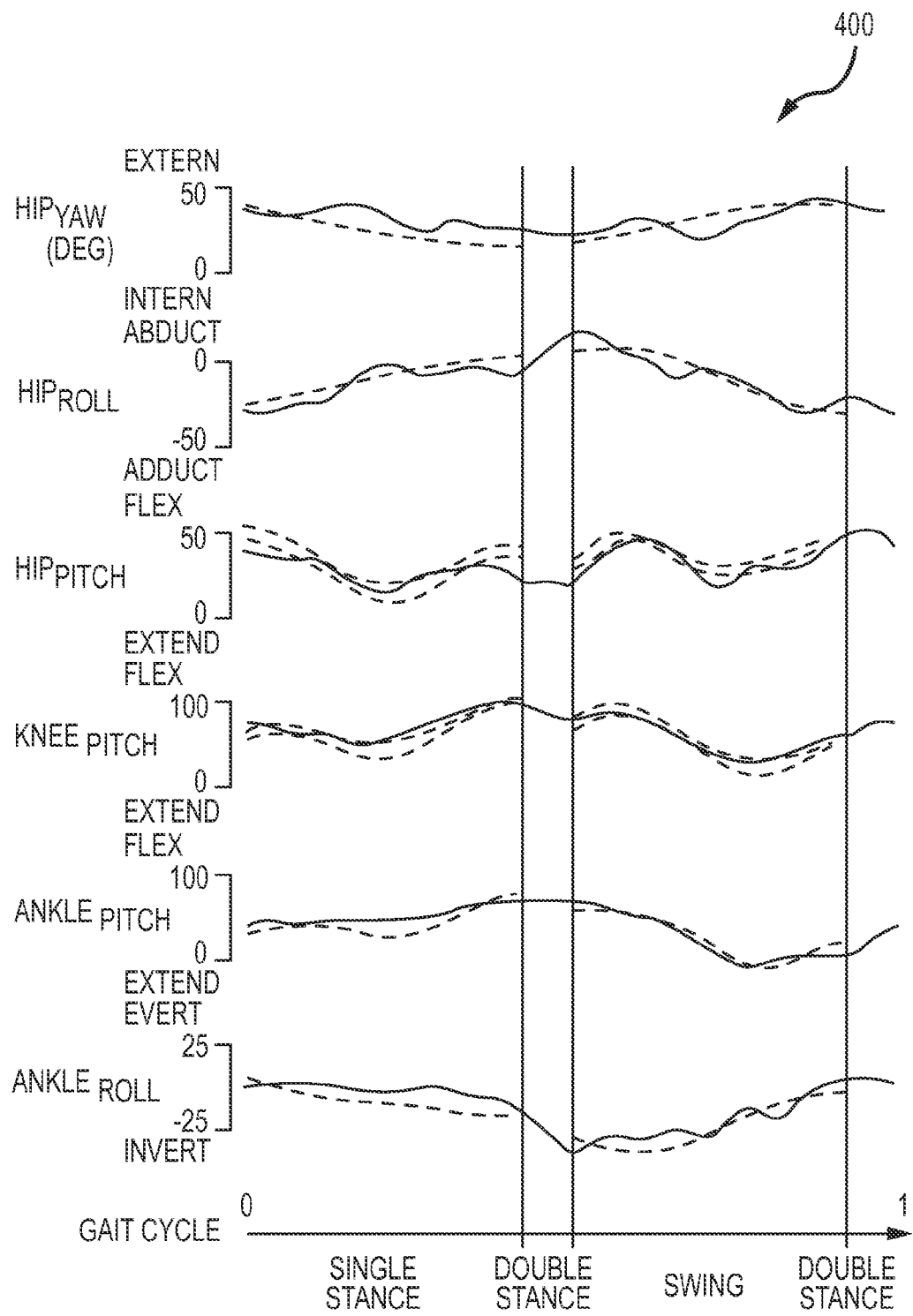
FIG. 4 shows graphically optimized walking trajectory for the robot of FIGS. 3A-3C to mimic a reference motion of the animation character of FIG. 1A.

The full walking motion is then obtained by connecting the single stance motion and the double stance motion. The joint trajectories of a full stride of one leg from single stance, double stance, swing, and double stance are shown in FIG. 4, along with the target single stance and swing motion. The ankle roll trajectory deviates most from the target trajectories. This is because the ankle can modulate the CoP most effectively with small movements. The resulting walking motion and its CoP and CoM trajectories are shown in FIG. 5C.

The robot 150 was also operated to test the physical design from the animation character and whether the animation character's walk was accurately mimicked. The optimized walking trajectory was tested on the hardware by tracking the open-loop joint trajectories with the servo motors. When the optimized trajectory was played back (used to control the robot's actuators), the robot was found to wobble forward because the robot did not perfectly produce the motion. Specifically, the stance leg flexes more and scuffs the swing foot at the beginning and end of the swing phase. This causes the swing foot to push against the ground and the stance foot to slip, which results in unstable walking. The test helped verify that the robot produces different motions under load by comparing the walking to sky-walking (playing the walking motion in the air), and two sources of motion error were believed to be the deformations of the links and the error of the servo motors.

During the test run, the robot was observed to slip less when the optimized motion was played back slower, and the resulting walking looked closer to the optimized walking. In theory, the CoP trajectory will be closer to the CoM trajectory for slower paced walking. The optimized CoM trajectory (shown in FIG. 5C) mostly remains above the stance foot and the unstable moment is short. Furthermore, when the CoM is out of the stance foot, it progresses toward either the current or the next stance foot. Therefore, the instability likely can be compensated for by the next stable phase. FIG. 5D shows the robot 150 walking two times slower than the optimized one.

It is believed based on the test results that the system/method can be enhanced to better track optimal trajectories. First, it is likely that optimal trajectories can be generated that are easier to track. For example, when optimizing a trajectory, a cost term can be included regarding the deformation of the linkages. In addition, as one optimizes for the robustness against CoP deviation, the robustness can be considered against swing foot height. Second, better segments can reduce the deformations. Further, one can investigate materials and structural designs to provide stiffer segments. Also, improving the strength of the segments may be desirable since the segments occasionally broke when the robot fell down during testing. Third, better tracking may be achieved by improving the servo control of the motors. Further, a feedforward controller can be added to the robot that adds offsets to the angular trajectories considering the load the joints and the segments will bear.

Figure 6:
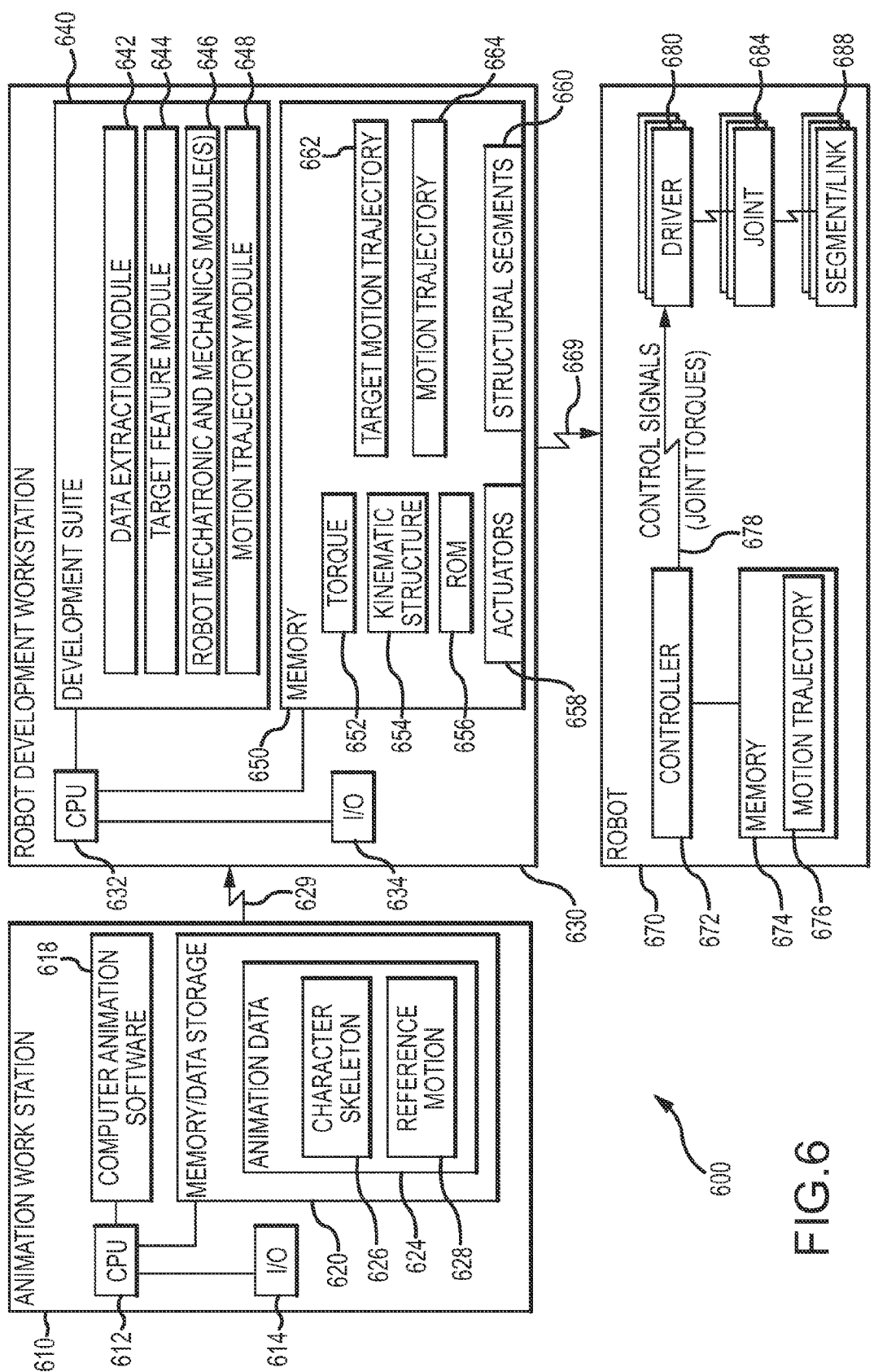
FIG. 6 is a functional block diagram of a robot development system of the present description.

FIG. 6 is a functional block drawing of a robot development system 600 according to the present description such as may be used to carry out the method 200 of FIG. 2. As shown, the system 600 includes an animation workstation 610, e.g., an animator's computer(s) used to create animated characters and to animate such characters. The workstation 610 includes a processor(s) 612 that manages operations of input and output devices 614 (e.g., a keyboard, a mouse, a screen (which may be a touchscreen) in which a graphical user interface (GUI) may be displayed, voice recognition devices, and the like). The processor 612 also manages memory/data storage devices 620 and executes code/software/executable instructions to provide functionality of computer animation (or computer graphics) software 618 (e.g., Maya or the like). During use of the workstation 610 and software 618, an animator (not shown) may generate a set of animation data 624 including a character skeleton (such as skeleton 120 of FIG. 1A) 626 and animation for this skeleton 626 as shown as reference motion 628.

The system 600 also includes a robot development workstation 630, e.g., a computer system particularly adapted for providing the functions shown for method 200 of FIG. 2, which is communicatively linked as shown at 629 with the animation workstation 610. The robot development workstation 630 may be operated by a robot designer to generate parameters useful for fabricating and assembling a robot 670 and for controlling the robot 670 such as with a motion trajectory 664 that can be communicated over communications link 669 to the robot 670. The workstation 630 includes a processor 632 managing operations of I/O devices 634 and for executing code/instructions/software programs to provide a development suite 640. Further, the processor 632 manages memory/data storage devices 650.

The development suite 640 includes a data extraction module 642 that acts to extract data from the animation data 624 including the character skeleton 626 and the reference motion 628 for the skeleton 626 (e.g., to perform step 210 of method 200 of FIG. 2). The suite 640 also includes a target feature module 644 that functions to set target features for the robot 670 (robot being designed) (e.g., to perform step 220 of method 200). Particularly, the module 644 processes the extracted data (skeleton 626 and reference motion 628) to determine torque requirements 652 for the robot 670. Further, module 644 processes the extracted data to produce a kinematic structure 654 and a range of motion (ROM) 656 for this kinematic structure 654 to provide the reference motion 628. Still further, the module 644 generates a target motion trajectory 662 based on the reference motion 628.

The development suite 640 also includes a robot mechatronic and mechanics module 646 for generating/selecting mechatronic components including actuators 658 using the torque requirements 652 as input (e.g., to perform step 240 of method 200 of FIG. 2) and for generating/selecting robot mechanics including structural segments/links 660 using the kinematic structure 654 and the ROM 656 as inputs (e.g., to perform step 250 of method 200 of FIG. 2). Further, the development suite 640 includes a motion trajectory module 648 that functions to process and modify the target motion trajectory 662 to suit the structural segments 660 and to provide the ROM 656 to produce a motion trajectory 664 for the robot 670 (e.g., to perform step 270 of method 200 of FIG. 2).

The motion trajectory 664 is communicated to the robot 670 and stored in memory 674 as shown at 676. The robot 670, which may be a bipedal humanoid robot or other robot with the motion trajectory being a walking motion, includes a controller (e.g., a tracking controller) 672 that processes the motion trajectory 676 to generate a set of control signals (e.g., joint torques) 678 that are communicated to the drivers 680 (e.g., servo motors or other actuators as defined by development suite 640 at 658) of the robot 670, which act at joints 684 to move segments/links 688 (which are provided based on structural segment definitions 660) so as to follow the motion trajectory 676 (e.g., to follow a walking motion) and mimic movements 628 of the animation character 626.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A robot adapted to mimic motion of an animation character, comprising:
   a plurality of structural segments interconnected at joints to provide a floating-base, legged robot assembly;
   a plurality of actuators each provided proximate to one of the joints for applying a torque to the structural segments to provide movement of the floating-base, legged robot assembly; and
   a controller providing control signals to the actuators to provide the movement of the robot based on a motion trajectory,
   wherein the motion trajectory is based on a reference motion extracted from animation data for the animation character and is modified based on a kinematic structure provided by the structural segments and actuators.

2. The robot of claim 1, wherein the floating-base, legged robot assembly is configured as a bipedal robot and wherein the reference motion is a walking motion for the animation character.

3. The robot of claim 1, wherein the actuators are chosen to provide torque requirements obtained from the reference motion.

4. The robot of claim 1, wherein the reference motion is modified to provide the motion trajectory while complying with a range of motion of hardware, which is defined in the reference motion for the animation character.

5. The robot of claim 1, wherein the reference motion is mapped to a configuration space of the structural elements of the robot and is modified to provide the motion trajectory by keeping a stance foot flat on the ground to retain stability.

6. The robot of claim 1, wherein the structural segments correspond with elements of a skeleton defined for the animation character in the animation data.

7. The robot of claim 6, wherein each of the structural segments has a size and a shape corresponding with a size and a shape of one of the elements of the skeleton.

8. The robot of claim 7, wherein the shape or the size of at least one of the structural segments differs from the shape or the size of the corresponding one of the elements of the skeleton whereby the robot has a range of motion corresponding to a range of motion of the animation character as defined in the reference motion.

9. A method of generating design and control criteria for a robot, comprising:
  from a data storage device, retrieving a set of animation data for a character;
  with a processor on a computer system, extracting data defining a character skeleton for the character from the set of animation data;
  with the processor, setting a set of target features for the robot including defining a kinematic structure based on the extracted data defining the character skeleton and further including defining a range of motion for the robot based on the set of animation data; and
  designing mechanics of the robot including a set of structural segments corresponding to the kinematic structure and the range of motion for the robot.

10. The method of claim 9, wherein the set of animation data comprises a model of the character from a computer animation software suite and an animation file for the model of the character, the model of the character providing the character skeleton and the animation file providing the range of motion for the robot.

11. The method of claim 9, wherein the mechanics designing comprises defining a shape and a size of each of the structural segments based on an element of the character skeleton.

12. The method of claim 11, wherein the mechanics designing further comprises modifying the shape or the size of at least one of the structural segments to comply with the range of motion for the robot.

13. The method of claim 9, further comprising extracting data from the set of animation data defining a reference motion for the robot, wherein the setting of the target features for the robot includes defining torque requirements for obtaining the reference motion, and the method further comprises selecting actuators to move the structural segments based on the torque requirements.

14. The method of claim 9, further comprising extracting data from the set of animation data defining a reference motion for the robot and generating a motion trajectory for the robot based on modifying the reference motion based on the set of structural segments, whereby the range of motion is retained for the robot during control of the robot using the motion trajectory.

15. The method of claim 14, wherein the reference motion is modified to generate the motion trajectory by keeping a stance foot in the set of structural segments on the ground and by applying trajectory optimization with a center of pressure (CoP) or zero moment point (ZMP) in a support polygon to provide stability.

16. A method for generating and controlling a humanoid robot to provide motions that mimic motion of an animation character, comprising:
  processing animation data for an animation character to obtain a character skeleton and a reference motion for the animation character;
  based on the character skeleton, defining a kinematic structure for a robot;
  based on the reference motion and the character skeleton, defining torque requirements for the robot; and
  based on the torque requirements, defining a plurality of actuators to move the kinematic structure of the robot based on the reference motion.

17. The method of claim 16, further comprising generating a motion trajectory based on the reference motion and controlling the actuators to operate the kinematic structure to follow the motion trajectory.

18. The method of claim 17, wherein the defining of the kinematic structure for the robot comprises defining a set of structural segments pivotally interconnected at joints and wherein at least one of the structural segments differs in size from a corresponding element of the character skeleton to provide the range of motion while the robot moves according to the motion trajectory.

19. The method of claim 17, wherein the reference motion is a walking trajectory for the animation character and wherein the motion trajectory corresponds to the walking trajectory while maintaining the ZMP in a support polygon.

20. The method of claim 17, wherein the motion trajectory is a walking motion for the robot generated by mapping the reference motion to the kinematic structure and by modifying the reference motion to keep a stance foot of the robot flat on the ground to provide stability via the ZMP criterion or to keep the CoP in a support polygon.

* * * * *